United States Patent
Ogrizovic

(10) Patent No.: US 11,746,867 B2
(45) Date of Patent: Sep. 5, 2023

(54) DRIVE DEVICE FOR ELECTRICALLY DRIVING A MOTOR VEHICLE, IN PARTICULAR A PASSENGER VEHICLE

(71) Applicant: Mercedes-Benz Group AG, Stuttgart (DE)

(72) Inventor: Goran Ogrizovic, Nuertingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 17/792,859

(22) PCT Filed: Dec. 10, 2020

(86) PCT No.: PCT/EP2020/085448
§ 371 (c)(1),
(2) Date: Jul. 14, 2022

(87) PCT Pub. No.: WO2021/144079
PCT Pub. Date: Jul. 22, 2021

(65) Prior Publication Data
US 2023/0044851 A1 Feb. 9, 2023

(30) Foreign Application Priority Data
Jan. 15, 2020 (DE) ...................... 10 2020 000 191.2

(51) Int. Cl.
*B60K 1/00* (2006.01)
*F16H 37/08* (2006.01)
(Continued)

(52) U.S. Cl.
CPC ............. *F16H 37/082* (2013.01); *B60K 1/00* (2013.01); *B60K 17/046* (2013.01);
(Continued)

(58) Field of Classification Search
CPC .... F16H 37/082; F16H 57/037; F16H 57/043; B60K 17/046
See application file for complete search history.

(56) References Cited

U.S. PATENT DOCUMENTS 2,737,829 A * 3/1956 Wilson ................ B60K 17/046
475/221
5,845,732 A * 12/1998 Taniguchi .............. B60K 17/16
180/65.6
(Continued)

FOREIGN PATENT DOCUMENTS

DE             44 10 074 C2   9/1995
DE    10 2007 045 531 A1      4/2009
(Continued)

OTHER PUBLICATIONS

PCT/EP2020/085448, International Search Report dated Mar. 11, 2021 (Two (2) pages).
(Continued)

*Primary Examiner* — Derek D Knight
(74) *Attorney, Agent, or Firm* — Crowell & Moring LLP

(57) ABSTRACT

A drive device for driving wheels of a motor vehicle includes a housing, an electric machine with a stator and rotor, a first output shaft for driving a first wheel, and a second output shaft for driving a second wheel. Via a differential transmission, first and second planetary gearsets are drivable by the rotor. First and second differential shafts transfer drive power from the differential transmission to the first and second planetary gearsets. The first differential shaft is mounted rotatably on an input shaft via bearings and the rotor is connected non-rotationally to the input shaft. A stable and non-buckling bearing of the second differential shaft in relation to the rotor is carried out via further bearings arranged on the second differential shaft or in the first
(Continued)

differential shaft. The further bearings are arranged spaced apart from one another at least at a distance of twice an average bearing diameter.

8 Claims, 2 Drawing Sheets

(51) Int. Cl.
| | |
|---|---|
| *H02K 5/20* | (2006.01) |
| *B60K 17/04* | (2006.01) |
| *B60K 17/16* | (2006.01) |
| *F16H 57/037* | (2012.01) |
| *F16H 57/04* | (2010.01) |
| *H02K 7/08* | (2006.01) |
| *H02K 7/116* | (2006.01) |
| *H02K 9/19* | (2006.01) |
| *F16H 57/02* | (2012.01) |

(52) U.S. Cl.
CPC ......... *B60K 17/165* (2013.01); *F16H 57/037* (2013.01); *F16H 57/043* (2013.01); *H02K 5/203* (2021.01); *H02K 7/083* (2013.01); *H02K 7/116* (2013.01); *H02K 9/19* (2013.01); *B60K 2001/001* (2013.01); *F16H 2057/02034* (2013.01); *F16H 2057/02052* (2013.01)

(56) References Cited

U.S. PATENT DOCUMENTS

| | | | |
|---|---|---|---|
| 10,036,458 B2* | 7/2018 | Littlefield | B60K 6/52 |
| 10,683,920 B2* | 6/2020 | Palfai | F16D 7/02 |
| 2018/0236861 A1 | 8/2018 | Jegebris et al. | |

FOREIGN PATENT DOCUMENTS

| | | |
|---|---|---|
| DE | 10 2014 220 347 A1 | 4/2016 |
| DE | 10 2017 211 881 A1 | 1/2019 |
| JP | 4701668 B2 | 6/2005 |

OTHER PUBLICATIONS

German-language German Office Action issued in German application No. 10 2020 000 191.2 dated Feb. 22, 2022 (Six (6) pages).

* cited by examiner

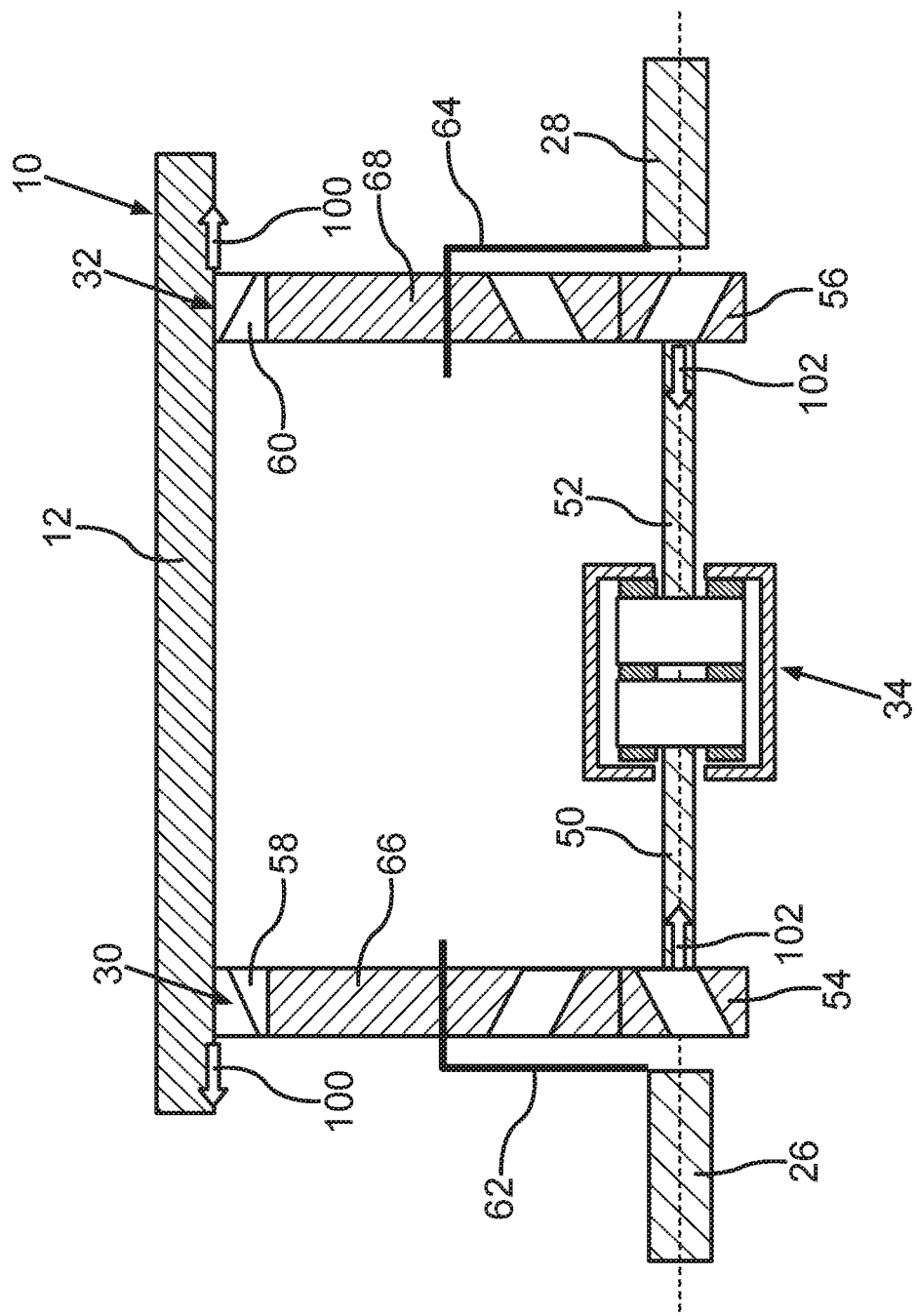

DRIVE DEVICE FOR ELECTRICALLY DRIVING A MOTOR VEHICLE, IN PARTICULAR A PASSENGER VEHICLE

BACKGROUND AND SUMMARY OF THE INVENTION

The invention relates to a drive device for electrically, in particular purely electrically, driving a motor vehicle, in particular a passenger vehicle.

Such a drive device for electrically, in particular purely electrically, driving wheels of an axis of a motor vehicle, in particular a passenger vehicle, is already known from DE 10 2017 211 881 A1, for example. The drive device has an electric engine which comprises a stator and a rotor. Moreover, the drive device, in particular the electric engine, comprises a housing, in which the stator and the rotor are arranged. Here, the stator is fixed on the housing and is thus connected at least non-rotationally to the housing. The rotor can be driven by the stator and thus can be rotated around a rotational axis in relation to the housing and in relation to the stator. The drive device has a first output shaft and a second output shaft. At least or exactly one first wheel can be electrically, in particular purely electrically, driven by the electric engine via the first output shaft. At least or exactly one second wheel can be electrically, in particular purely electrically, driven by the electric engine via the second output shaft.

Here, the drive device comprises a first planetary gearset, via which the first output shaft can be driven electrically, in particular purely electrically, by the rotor and thus by the electric engine. Moreover, the drive device comprises a second planetary gearset, via which the second output shaft can be driven electrically, in particular purely electrically, by the rotor. Moreover, the drive device comprises a differential transmission, via which the planetary gearset can be driven electrically, in particular purely electrically, by the rotor and thus by the electric engine. Here, the differential transmission has an input element which is non-rotationally, in particular directly, connected to the rotor.

The object of the present invention is to improve a drive device of the kind mentioned at the start.

In order to improve a drive device of the kind mentioned herein, it is provided according to the invention that the respective planetary gearset is attached to the rotor at least extensively, in particular completely, and is thus arranged at least extensively, in particular completely, outside the rotor. Thus, it is preferably provided that the respective planetary gearset is not or not completely arranged inside the rotor, but is attached to the rotor at least extensively or completely in the axial direction of the electric engine. The feature that the respective planetary gearset is attached at least extensively, in particular completely, to the rotor in the axial direction of the electric engine is to be understood, in particular, to mean that more than half the extension of the respective planetary gearset running in the axial direction of the electric engine, in particular the entire extension running in the axial direction, runs outside the rotor and is thus not covered by the rotor outwardly in the radial direction of the electric engine.

In an advantageous design of the invention, it is provided that a respective ring gear of the respective planetary gearset is non-rotationally connected to the housing.

In an advantageous design of the invention, it is provided that the differential transmission is attached at least extensively to the rotor in the axial direction of the electric engine and is thus arranged at least extensively outside the rotor.

In an advantageous design of the invention, it is provided that the differential transmission is covered at least partially by a winding head of a winding of the stator outwardly in the radial direction of the electric engine.

In an advantageous design of the invention, it is provided that a first planetary support of the first planetary gearset is non-rotationally connected to the first output shaft, wherein a second planetary support of the second planetary gearset is non-rotationally connected to the second output shaft.

It is provided that the two planetary gearsets are attached completely to the rotor in the axial direction of the electric engine and are thus each arranged completely outside the rotor.

In an advantageous design of the invention, it is provided that the differential transmission is formed as a spur gear differential or as a bevel gear differential.

In particular, the invention makes it possible to implement an electric drive device that is coaxial in relation to the gears without shafts switched into one another or conducting torque, that is to say without a shaft driven by the rotor and having a toothing provided for transferring rotor torque being designed as a hollow shaft, which is penetrated by a shaft conducting the output torque. Thus, a pitch circle diameter of a respective sun gear of the respective planetary gearset having to follow a hollow shaft can be avoided, such that the respective sun gear with a small pitch circle diameter can be depicted. In turn, this makes it possible to depict a high ratio by the respective, preferably single-row or single-piece planetary gearset. Preferably, the respective planetary gearset, also referred to as a planetary set, has a stationary ratio which ranges from 7 to 10 inclusive. The torque transferred from the differential to the two output sides and still to be rendered is distributed in even amounts to the two sides. As a result of the very low torque on the sun gear, this and the corresponding output shaft can be designed with a small diameter. This makes it possible to implement a high ratio, in particular stationary ratio, of approximately 7 to 10. Moreover, the differential transmission can be designed as a particularly compact differential, since the torques to be rendered are about 90% smaller than in conventional solutions. Moreover, forces bearing on the housing can be avoided or kept to a minimum. To do so, it is preferably provided that respective bevels of respective bevelled toothings, lying opposite one another in the axial direction of the electric engine, of toothed gears are formed or arranged in opposition. As a result of these bevelled toothings presently arranged, axial forces can be braced inside the differential transmission, by means of a suitable arrangement of the bearings in the differential transmission, and thus their force effect can be outwardly compensated for.

As a result of the input element of the differential transmission being non-rotationally connected to the rotor, the differential transmission is attached directly to the rotor. The electric engine can provide torques via the rotor for driving the gears. As a result of the input element being non-rotationally connected directly to the rotor, the respective torque is transferred directly or immediately from the rotor to the input element and is introduced into the differential transmission via the input element. Thus, the input element is preferably the component of the differentia transmission via which the torque, which is provided by the rotor, is firstly introduced into the differential transmission.

In particular, the invention makes possible the implementation of the following advantages:

coaxial shaft arrangement; in other words, it is preferably provided that the output shafts preferably formed as solid shafts or massive shafts are arranged coaxially in relation to one another;

compact differential transmission favorable in terms of weight;

minimal need for construction space;

unit of electric engine and transmission can be depicted inside a sleeve cylinder, such that the need for construction space can be kept particularly minimal;

a high ratio, in particular a stationary ratio, is possible by means of the respective planetary gearset;

a total ratio is possible, in particular, which ranges from 8 to 11 inclusive;

respective planetary gears of the respective planetary gearset do not generate any axial forces, in particular on the respective output shaft, such that the output shafts can be mounted by means of bearings favorable in terms of construction space;

respective sun gears obliquely toothed in opposition of the respective planetary gearset generate opposing axial forces, which are supported in the differential transmission. No further outwardly effective bearing forces emerge which would have to be received by bearings in the planetary supports or housings;

high degree of toothing effectiveness, since preferably only one planetary gear level is provided per working side or output shaft;

high degree of effectiveness at bearing points, since small bearings can be used, which are also loaded axially minimally; and low frictional losses at quickly rotating rotational implementations for the coolant and lubricant, since these only have a small diameter.

Further advantages, features and details of the invention emerge from the below description of preferred exemplary embodiment and by means of the drawings. The features and feature combinations mentioned above in the description and the features and feature combinations mentioned below in the description of the figures and/or shown only in the figures can be used not only in the respective specified combination, but can also be used in other combinations or on their own without leaving the scope of the invention.

BRIEF DESCRIPTION OF THE DRAWINGS

FIG. 2 is a schematic sectional depiction of a second embodiment of the drive device.

DETAILED DESCRIPTION OF THE DRAWINGS

Figure 1:
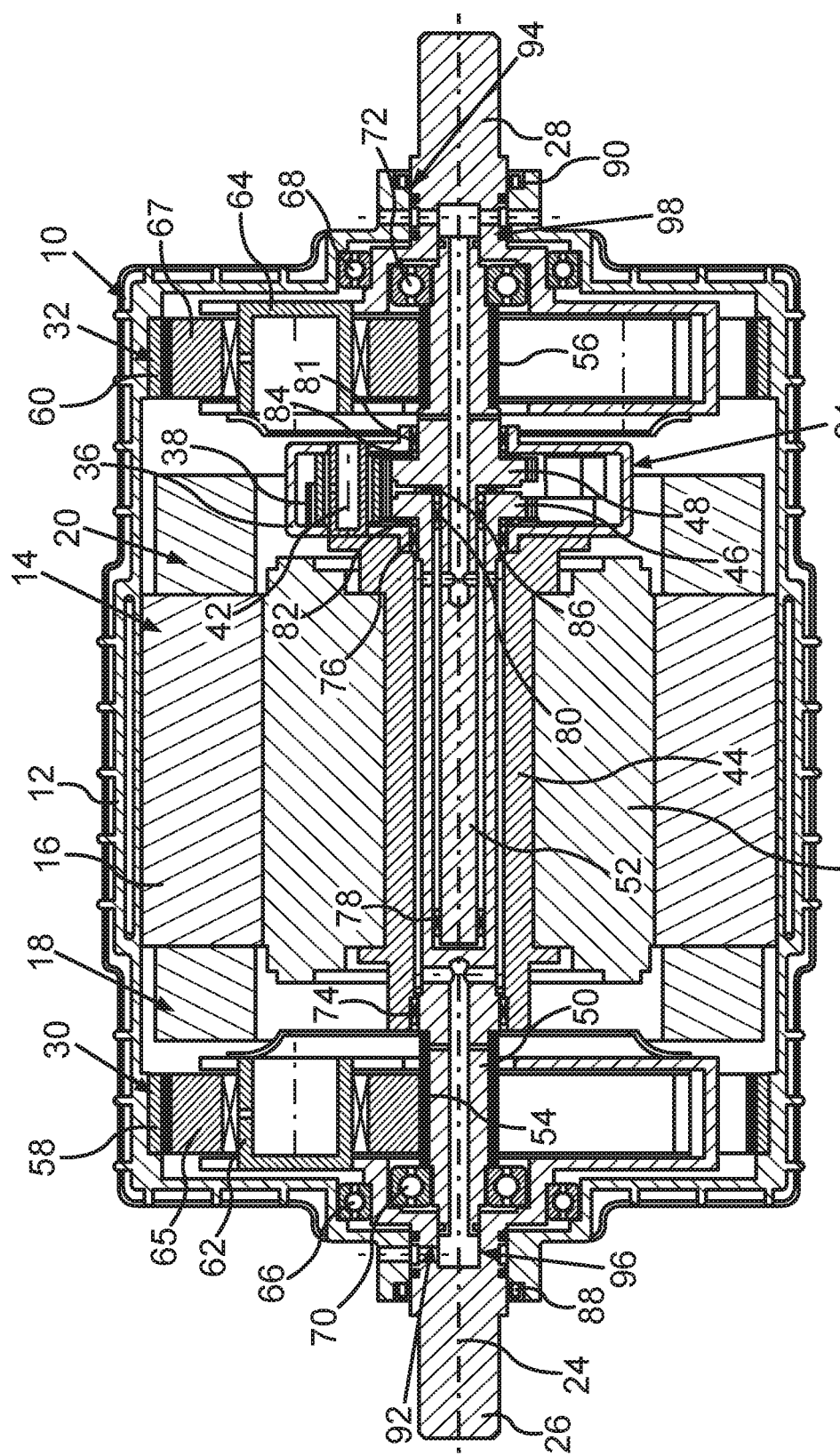
FIG. 1 is a schematic longitudinal sectional view of a drive device according to the invention according to a first embodiment.

In the figures, the same or functionally identical elements are provided with the same reference numerals.

FIG. 1 shows, in a longitudinal sectional view, a first embodiment of a drive device 10 for electrically driving wheels of an axis of a motor vehicle, in particular a passenger vehicle. This means that the motor vehicle preferably formed as a passenger vehicle comprises the axis, which preferably has exactly two wheels in the form of the wheels mentioned above. Here, the wheels and thus the motor vehicle overall can be driven electrically, in particular purely electrically, by means of the drive device 10. To do so, the drive device 10 comprises a housing 12 and an electric engine 14, which comprises a stator 16 arranged in the housing 12 and fixed on the housing 12. This means that the stator 16 is at least non-rotationally connected to the housing 12. The stator 16 also has at least one winding, which forms respective winding heads 18 and 20. The winding head 18 is arranged on a first side S1 of the stator 16, while the winding head 20 is arranged on a second side S2 of the stator 16. Here, the second side S2 is facing away from the first side S1 in the axial direction of the electric engine 14 or vice versa. The respective winding head 18 or 20 is formed, in particular, by the winding on the respective side S1 or S2 protruding in the axial direction from a support of the stator 16 formed, for example, as a stack of sheets.

The electric engine 14 here has a rotor 22, which can be driven by the stator 16 and can thus be rotated around an axis of rotation 24 in relation to the stator 16 and in relation to the housing 12. The electric engine 14 can provide torques via the rotor 22, by means of which torques the gears and thus the motor vehicle can be driven electrically, in particular purely electrically.

The drive device 10 has a first output shaft 26, also referred to as a first lateral shaft, and a second output shaft 28, also referred to as a second lateral shaft. The output shafts 26 and 28 can be rotated around the axis of rotation 24 in relation to each other, in relation to the housing 12 and in relation to the stator 16 and, as is explained more accurately below, can be driven electrically, in particular purely electrically, by the rotor 22 and thus by the electric engine 14. Here, a first of the wheels 26 can be driven by the output shaft 28. Thus, the first wheel can be driven electrically by the electric engine 14 via the output shaft 26, and the second wheel can be driven electrically by the electric engine 14 via the output shaft 26. For example, the first wheel is arranged coaxially to the output shaft 26 and/or is non-rotationally connected to the output shaft 26. Alternatively or additionally, the second wheel is arranged coaxially to the output shaft 28 and/or non-rotationally connected to the output shaft 28. Here, the wheels are arranged on opposite sides of the motor vehicle in the transverse direction of the vehicle, such that the first wheel, for example, is arranged on the left-hand side of the motor vehicle in the forwards driving direction and the second wheel on the right-hand side of the motor vehicle in the forwards driving direction.

At least or exactly one planetary gearset 30 or 32, also referred to as a planetary set, is provided per output shaft 26 or 28. As is explained in more detail below, the output shaft 26 can be driven by the rotor 22 via the corresponding planetary gearset 30, and the output shaft 28 can be driven by the rotor 22 via the corresponding planetary gearset 32. The drive device 10 moreover comprises a differential transmission 34, also simply referred to as a differential, via which the planetary gearsets 30 and 32 can be driven by the rotor 22. Here, the differential transmission 34 has an input element 36, which is non-rotationally connected to the rotor 22, in particular permanently. In the embodiment shown in FIG. 1, the differential transmission 34 is formed as a spur gear differential transmission. Here, the input element 36 is, for example, a support or planetary support, on which respective compensation gears 38, formed separately from one another, are rotatably mounted. The compensation gears 38 are toothed gears, which are presently preferably formed as spur gears. The compensation gears 38 are formed separately from one another and can be rotated around a second axis of rotation 42 in relation to the input element 36 and in relation to each other. The input element 36 is non-rotationally connected to the rotor 22, for example via an input shaft 44, wherein the rotor 22, for example, is non-rotationally connected to the input shaft 44 and is arranged, in particular, on the input shaft 44. Moreover, the input element 36 is non-rotationally connected to the input shaft 44.

In the Fig., one of the compensation gears 38 can be seen, wherein a different compensation gear 38 cannot be seen. The differential transmission 34 has output gears 46 and 48. The output gear 46 meshes with the one compensation gear 38, yet not with the other compensation gear 38, and the output gear 48 meshes with the other compensation gear 38, yet not with the other compensation gear 38. The output gears 46 and 48 are each toothed gears, which are preferably formed as spur gears. The output gears 46 and 48 can be rotated around the axis of rotation 24 in relation to each other and in relation to the housing 12. Overall, it can be seen that the output gear 46 can be driven by the input element 36 via the compensation gear 38, and the output gear 48 can be driven by the input element 36 via the other compensation gear 38. The output gear 48 is non-rotationally connected to a first output shaft 50, and the output gear 48 is non-rotationally connected to a second output shaft 52. The output shafts 50 and 52 can be rotated, for example, around the axis of rotation 24 in relation to each other and in relation to the housing 12. The output shaft 50 is also referred to as the first differential shaft or as the first differential transmission shaft, and the second output shaft 52 is also referred to as the second differential shaft or as the second differential transmission shaft. Here, the planetary gearset 30 can be driven by the output shaft 50 and thus by the rotor 22 via the output shaft 50, and the planetary gearset 32 can be driven by the output shaft 52 and by the rotor 22 via the output shaft 52.

The respective planetary gearset 30 or 32 has a respective sun gear 54 or 56, a respective ring gear 58 or 60, respective planetary gears and a respective planetary support 62 or 64. Particularly schematically and by way of example in FIG. 1, a planetary gear labelled with 65 is made up of the planetary gears of the planetary gearset 30. Particularly schematically and by way of example in FIG. 1, a planetary gear labelled with 67 is made up of the planetary gears of the planetary gearset 32. The designs above and below making up the planetary gear 65 can also be readily transferred to the other planetary gears of the planetary gearset 30 and vice versa. The designs above and below making up the planetary gear 67 can be readily transferred to the other planetary gears of the planetary gearset 32 and vice versa. The planetary gears of the planetary gearset 30 can mesh on one hand, to the sun gear 54 and, on the other hand, to the ring gear 58 of the planetary gearset 30 and are mounted rotatably on the planetary support 62, also referred to as a first web. The planetary gears of the planetary gearset 32 mesh with the sun gear 56 and with the ring gear 60 of the planetary gearset 32 and are mounted rotatably on the planetary support 64 also referred to as the second web. Here, the ring gears 58 and 60 are non-rotationally connected to the housing 12. The sun gear 54 is non-rotationally connected to the output shaft 50, and the sun gear 56 is non-rotationally connected to the output shaft 52. The respective sun gear 54 or 56 is thus an input of the respective planetary gearset 30 or 32, via the input of which torques provided by the respective output shaft 50 or 52 can be introduced or are introduced into the respective planetary gearset 30 or 32. The respective planetary gearset 62 or 64 is a respective output of the respective planetary gearset 30 or 32, via the output of which the respective planetary gearset 30 or 32 can provide torques for driving the respective wheel. Here, the planetary support 62 is non-rotationally connected to the output shaft 26, such that the output shaft 26 can be driven by the planetary gearset 30 via the planetary support 62. The planetary support 64 is non-rotationally connected to the output shaft 28, such that the output shaft 28 can be driven by the planetary gearset 32 via the planetary support 64.

It is provided that the respective planetary gearset 30 or 32 is attached to the rotor 22 at least extensively, in particular completely, in an axial direction of the electric engine 14 and is thus arranged at least extensively, in particular completely, outside the rotor 22. Here, the planetary gearsets 30 and 32 are arranged on the sides S1 and S2 of the stator 16 or the rotor 22 opposite each other in the axial direction of the electric engine 14. In particular, the ring gears arranged on the sides S1 and S2 are arranged at least extensively, in particular completely, outside the rotor 22 in the axial direction of the electric engine 14.

It is provided that the differential transmission 34 is attached at least extensively, in particular completely, to the rotor 22 in the axial direction of the electric engine 14, the axial direction of which coincides with the axis of rotation 24 of the output shaft 26, and is thus arranged at least extensively, in particular completely, outside the rotor 22. Presently, at least the input element 36, the compensation gears 38, the output gears 46 and 48 are arranged completely outside the rotor 22 in the axial direction of the electric engine 14 and thus without overlap with the rotor 22 in the radial direction of the electric engine 14. Here, the differential transmission 34 is superimposed or overlapped at least partially with the winding head 20 outwardly in the radial direction of the electric engine 14, in particular in such a way that the compensation gears 38 and/or the output gears 46 and 48 are overlapped or covered by the winding head 20 in each case at least partially, in particular at least extensively or completely, outwardly in the radial direction of the electric engine 14. Moreover, the two planetary gearsets 30 and 32 are completely attached to the rotor 22 and to the stator 16 in the axial direction of the electric engine 14, such that the two planetary gearsets 30 and 32 are arranged completely outside the rotor 22 in the axial direction of the electric engine 14 and also completely outside the stator 16. Here, the planetary gearset 30 and the output shaft 26 are arranged on the side S1 of the stator 16, while the planetary gearset 32 and the output shaft 28 are arranged on the side S2 of the stator 16 opposite the side S1.

Overall, it can be seen that the differential transmission 34 is axially attached to the rotor 22 and is not covered by the rotor 22 outwardly in the radial direction, for example. In the first embodiment, the differential transmission 34 is arranged in a space below the winding head 20. In the first embodiment, the differential transmission 34 is a shaft differential, yet could alternatively be a bevel gear differential. The design of the differential transmission 34 as a shaft transmission or a spur gear differential transmission is advantageous insofar as the construction space requirement of the differential transmission 34 in the radial direction can be kept particularly minimal.

The respective planetary gearset 30 or 32 has at least one or exactly one gear transmission stage or is a gear transmission stage, wherein the differential transmission 34 is arranged upstream of the planetary gearsets 30 and 32, i.e., before the planetary gearset 30 and 32, in relation to a torque flow, along which the respective torque provided by the electric engine 14 via the rotor 22 is transferred from the rotor 22 to the respective wheel. In doing so, the respective gear transmission stage can be designed for particularly minimal torque, such that the construction space need and the weight and the costs are kept particularly low. With gear ratios of from 7 to 12, in particular 10, a torque capacity lower by 90% emerges in comparison to conventional solutions. The differential can thus be designed to be particularly favorable in terms of construction space and weight. The two output shafts 50 and 52, also referred to as differential output shafts, transfer drive power to the two planetary gearsets 30 and 32.

The planetary gearsets 30 and 32 are either formed as single-piece planetary gearsets, as is shown in FIG. 1, or as two-stage or two-stepped planetary gearsets. The respective torque, also referred to as drive moment, is distributed in even parts, for example by means of the differential transmission 34 and is thus distributed onto the planetary gearsets 30 and 32, for example in each case fifty-fifty. As a result of the drive moments being distributed 50/50, the output shafts 50 and 52 can have a particularly small diameter, such that a respective toothing of the respective sun gear 54 or 56 can also be designed with a particular small pitch circle or pitch circle diameter. Such a small diameter of the respective sun gear 54 or 56 makes it possible to depict advantageous gear ratios by for example 9 in the respective, preferably single-stage planetary gearset 30 or 32.

In this shaft arrangement, torque-conducting shafts switched into one another, such as a combination of solid shaft and hollow shaft, are avoided. Thus, for example, the output shafts 50 and 52 can have a particularly small diameter, such that the respective toothing of the respective sun gear 54 or 56 with a small pitch circle can also be chosen. Such a small pitch circle or pitch circle diameter of the respective sun gear 54 or 56 makes it possible to also depict advantageous gear ratios of, for example, 9 in a single-stage planetary gearset. In common coaxial arrangements, the torque translated is guided with a shaft by the electric engine 14 and, in particular, by a torque-guiding hollow shaft of the rotor. In terms of its diameter, the shaft must be designed for the translated torque. The hollow shaft diameter follows the shaft diameter. Thus, the pitch circle diameter of the sun gear is delimited downwardly, and, with the construction space given for the hollow gear in a toothed gear track, only small gear ratios can be implemented. In order to nevertheless implement high gear transmission ratios in a planetary gearset, in particular with a planetary support, a two-stage planetary gearset with stepped planetary gears is usually used, which leads to a high width and thus to a large axial construction space requirement. This can be avoided in the drive device 10.

As can be seen in FIG. 1, the drive device 10 has bearings 66 and 68, via which the planetary supports 62 and 64 or the output shafts 26 and 28 are mounted rotatably on the housing 12. The bearings 66 and 68 are, for example, roller bearings and/or radial bearings and/or axial bearings. The respective bearing 66 to 68 is a slowly rotating bearing or a slowly rotating bearing point. Moreover, the drive device 10 has bearings 70 and 72, wherein the output shaft 50 or the sun gear 54 is rotatably mounted via the bearing 70 on the planetary support 62 or on the housing 12. The output shaft 52 or the sun gear 56 is rotatably mounted on the planetary support 64 or on the housing 12 via the bearing 72. Here, the bearings 70 and 72 are quickly rotating bearings or quickly rotating bearing points. The bearings 70 and 72 are, for example, roller bearings and/or radial bearings and/or axial bearings. Moreover, the drive device 10 comprises bearings 74 and 76, via which the output shaft 50 is rotatably mounted on the rotor 22 or on the input shaft 44. The respective bearing 74 or 76 is, for example, a radial bearing and/or a glide bearing and/or a pin bearing and/or for example only provided with steering impact difference rotational speed.

The same also applies, for example, to bearings 78 and 80 of the drive device 10, wherein the output shaft 52 is rotatably mounted on the output shaft 50 via the bearings 78 and 80. Moreover, bearings 82 and 84, for example, are provided, via which for example the input element 36, at least in the axial direction of the electric engine 14, is rotatably mounted on the output gears 46 and 48. Moreover, the drive device 10 comprises a bearing 86, via which for example the output gears 46 and 48 are mounted or supported in the axial direction of the electric engine 14 rotatably in relation to one another.

Furthermore, a first sealing element 88 is provided, by means of which the output shaft 26 is sealed to the housing 12. Furthermore, a sealing element 90 is provided, by means of which the output shaft 28 is sealed to the housing 12. The sealing elements 88 and 90 are formed, for example, as radial shaft sealing rings.

The bearings 78 and 80 also referred to as bearing points between the output shafts 50 and 52 generate an inherently stable, non-buckling shaft arrangement. The bearing 81 also referred to as a bearing point in the differential complements the bearing of the shaft, in order to obtain additional stability of the shaft arrangement. The bearings 74 and 76 also referred to as bearing points in the rotor 22 mount the rotor 22 radially on the output shaft 50. The bearings 82, 84 and 86 also referred to as bearing points axially mount the rotor 22.

The respective sun gear 54 or 56 has, for example, a bevelled toothing, wherein it is preferably provided that the bevelled toothing is designed in opposition. In other words, the bevelled toothings are preferably in opposition to one another. With such an opposite design of the bevelled toothings of the sun gears 54 and 56, axial forces act in opposition. The axial forces are always the same size, whereby the axial forces are compensated for. The bearings 82, 84 and 86 preferably formed as axial bearings inside the differential transmission 34 and/or the rotor 22 support the forces in such a way that an axial force transferral between the two sun gears 54 and 56 is possible. Thus, no forces act outwardly or no toothing forces are transferred to the bearings 66, 68, 70 and 72.

In the event of straight exit of the motor vehicle, the bearings 74, 76, 78, 80, 81, 82, 84 and 86 also referred to as bearing points do not experience any difference rotational speed and then also do not generate any frictional power. In contrast, when driving in a curve, only low difference rotational speeds occur. Low differential speeds also allow the selection of simple bearings with higher friction, for example sliding bearings, since this has a low influence on the degree of effectivity. Only the bearings 70 and 72 also referred to as bearing points on the respective sun gear 54 or 56 experience a high rotational speed, which is, however, lower than the rotational speed of the rotor. A rotational speed reduced by the output rotational speed (rotational speed of the sun gear minus rotational speed of the output) at the respective bearing 70 or 72 reduces the frictional power. Overall, there are only four bearings in the form of the bearings 66, 68, 70 and 72 which are also rotated in the event of a straight exit. Only two bearings in the form of the bearings 70 and 72 thereof experience a high rotational speed. As a result of the bearings 66, 68, 70 and 74 not having to transfer any axial toothing forces, they can be dimensioned to be small. As a result of the shaft section receiving the bearings 70 and 72 not being in the torque flow, the minimal inner diameter of the bearings is not defined by the torque capacity of the shaft. Smaller bearing diameters generate an over-proportionally smaller frictional power dependent on the rotational speed. Small or no axial forces in rotating bearings generate low frictional power dependent on the load. The sun gears 54 and 56 or the output shafts 50 and 52 are mounted, for example, in the output shafts 26 and 28. In turn, the output shafts 26 and 28 are mounted in housing covers or above the bearings 66 and 68. Outwardly acting axial forces which would have to be supported by the bearings 66 and 68 do not emerge on the planetary supports 62 and 64 or on the planetary gears. Thus, bearings with low support capability or small diameters can be chosen, whereby the frictional power can be kept particularly low.

The rotor 22 can be cooled from the inside by a coolant being guided through the shafts. An annular channel advantageous for cooling the rotor is formed between the input shaft 44 and the output shaft 50. With a spur gear differential, a sealed coolant transfer can be represented between the two output shafts, for example with shaft sealing rings. With the design of the bearings 74, 76, 78 and 80 and sliding bearings, the sealing of the coolant/lubricant circuit can be carried out by the bearing gap with leakage. The gearset is here not in oil. Lubricating the toothing, bearings, thrust washer can be ensured by leakage oil on sliding bearings. The sliding bearings can also be combined with shaft sealing rings. Roller bearings in combination with shaft sealing rings can also be used instead of sliding bearings.

With a bevel gear differential, the interior of the bevel gear differential can be used as the passage for the oil. In this case, the bevel gears in the housing would be in oil. When a coolant/lubricant passes through, all components that require lubricating can be supplied, in the simplest case designed as radial bores in the shafts. The coolant transition is carried out at the rotating guide-throughs 92 and 94, which presently comprise or form the sealing elements 88 and 90, for example. In particular, the coolant transition is carried out at the rotating guide-throughs 92 and 94 with a low difference rotational speed between the housing 12 and the output shafts 26 and 28. The coolant transition is carried out, for example, at rotating guide-throughs 96 and 98, optionally with a high difference rotational speed between the housing 12 and the output drives 26 and 28, yet also on a small sealing diameter and thus with only low frictional power.

FIG. 2 illustrates a second embodiment of the drive device 10. As is illustrated in FIG. 2 by arrows 100, forces are supported on the respective hollow gear 58 or 60 on the housing 12. As is further depicted by arrows 102, forces are braced on the respective sun gear 54 and 56 inside the shaft arrangement. Number forces on the left and right-hand side are always the same size, since the number forces can only occur when they are supported on the two sides via drive resistance. A moment or force imbalance is compensated for by the differential. No axial forces act on the respective output shaft 26 or 28, since planetary gearsets are fundamentally free of axial force or neutral in terms of axial force. Bearings in the differential and/or in the rotor 22 can receive axial forces, namely by tension and/or pressure. Support is carried out, for example, via sliding bearing rings or axial pin bearings and toothing in the differential. Moreover, the opposite bevelled toothings of the sun gears 54 and 56 can be seen particularly well from FIG. 2.

It is preferably provided that the bearings 70 and 72 are arranged outside the torque guiding path of the shafts 26 and 52, i.e., are not arranged between the sun gears 54 and 56 of the planetary gearsets and the output gears 46 and 48 of the differential transmission 34, but instead in the planetary supports 62 and 64 or output shafts 26 and 28.

Furthermore, it can preferably be provided that the three axial bearings 82, 84 and 86 in the differential transmission 34 and the fixed attachment of the suns or sun gears 46 and 48 on the shafts 50 and 52 make it possible to support the axial forces occurring as a result of toothing forces, depending on the force direction, either directly above the bearing 86 or above the bearings 82 and 84 and the input element 36 or the planetary support of the differential transmission 34.

It is preferably provided that the bearings 78 and 80 arranged on the shaft 52 or in the shaft 50 are arranged so far apart from each other, in particular at a distance apart of two times the average bearing diameter, that a stable and non-buckling alignment or bearing of the shaft is possible in relation to the rotor.

Furthermore, it can preferably be provided that the shaft 50 leads through the input shaft 44 or the rotor 22 and thus rotatably mounts the rotor 22 on the bearings 74 and 76.

It is preferably provided that the output shafts 50 and 52 have an inlet and an outlet and channels for guiding a coolant/lubricating fluid, and the input shaft 44 and the output shaft 50 form an annular chamber for guiding a fluid for the purpose of cooling the rotor.

LIST OF REFERENCE CHARACTERS

10 Drive device
12 Housing
14 Electric engine
16 Stator
18 Winding head
20 Winding head
22 Rotor
24 Axis of rotation
26 Output shaft
28 Output shaft
30 Planetary gearset
32 Planetary gearset
34 Differential transmission
36 Input element
38 Compensation gears
42 Axis of rotation
44 Input shaft
46 Output gear
48 Output gear
50 Output shaft
52 Output shaft
54 Sun gear
56 Sun gear
58 Ring gear
60 Ring gear
62 Planetary support
64 Planetary support
65 Planetary gear
66 Bearing
67 Planetary gear
68 Bearing
70 Bearing
74 Bearing
76 Bearing
78 Bearing
80 Bearing
81 Bearing
82 Bearing
84 Bearing
86 Bearing
88 Sealing element
90 Sealing element 92 Sealing guide-through
94 Sealing guide-through
96 Sealing guide-through
98 Sealing guide-through
100 Arrow
102 Arrow
S1 Side
S2 Side

The invention claimed is:

1. A drive device (10) for electrically driving wheels of an axis of a motor vehicle, comprising:
   a housing (12);
   an electric machine (14) which has a stator (16) arranged in the housing (12) and fixed on the housing (12) and a rotor (22) arranged in the housing (12), wherein the rotor (22) is drivable by the stator (16) and is rotatable around an axis of rotation (24) in relation to the housing (12) and in relation to the stator (16);
   a first output shaft (26), wherein via the first output shaft (26) a first wheel is drivable by the electric machine (14);
   a first planetary gearset (30), wherein via the first planetary gearset (30) the first output shaft (26) is drivable by the rotor (22);
   a second output shaft (28), wherein via the second output shaft (28) a second wheel is drivable by the electric machine (14);
   a second planetary gearset (32), wherein via the second planetary gearset (32) the second output shaft (28) is drivable by the rotor (22); and
   a differential transmission (34) having an input element (36) non-rotationally connected to the rotor (22), wherein via the differential transmission (34) the first and second planetary gearsets (30, 32) are drivable by the rotor (22);
   wherein the first and second planetary gearsets (30, 32) are attached at least extensively to the rotor (22) in an axial direction of the electric machine (14) and are arranged at least extensively outside the rotor (22);
   wherein the differential transmission (34) is attached in the axial direction of the electric machine (14) at least extensively to the rotor (22) and is arranged at least extensively outside the rotor (22), wherein first (50) and second (52) differential shafts transfer drive power from the differential transmission (34) respectively to the first and second planetary gearsets (30, 32), wherein the first differential shaft (50) leads through an input shaft (44), wherein the first differential shaft (50) is mounted rotatably on the input shaft (44) via bearings (74, 76), and wherein the rotor (22) is connected non-rotationally to the input shaft (44) and is arranged on the input shaft (44);
   wherein the differential transmission (34) is formed as a spur gear differential, wherein a stable and non-buckling bearing of the second differential shaft (52) in relation to the rotor (22) is carried out via further bearings (78, 80) arranged on the second differential shaft (52) or in the first differential shaft (50), and wherein the further bearings (78, 80) are arranged spaced apart from one another at least at a distance of twice an average bearing diameter.

2. The drive device (10) according to claim 1, wherein a respective ring gear (58, 60) of the respective planetary gearset (30, 32) is non-rotationally connected to the housing (12).

3. The drive device (10) according to claim 1, wherein the differential transmission (34) is covered outwardly in a radial direction of the electric machine (14) at least partially by a winding head (20) of a winding of the stator (16).

4. The drive device (10) according to claim 1, wherein a first planetary support (62) of the first planetary gearset (30) is non-rotationally coupled to the first output shaft (26) and wherein a second planetary support (64) of the second planetary gearset (32) is non-rotationally coupled to the second output shaft (28).

5. The drive device (10) according to claim 1, wherein the first and second planetary gearsets (30, 32) are attached completely to the rotor (22) in the axial direction of the electric engine (14) and are each arranged completely outside the rotor (22).

6. The drive device (10) according to claim 1, wherein the input element (36) is non-rotationally connected to the rotor (22) via the input shaft (44).

7. The drive device (10) according to claim 1, further comprising axial bearings (82, 84), wherein via the axial bearings the input element (36) is supported, at least in the axial direction of the electric machine (14), rotatably on output gears (46, 48), and further comprising a further axial bearing (86), wherein via the further axial bearing (86) the output gears (46, 48) are supported in the axial direction of the electric machine (14) rotatably on one another.

8. The drive device (10) according to claim 1, wherein the first and second differential shafts (50, 52) have an inlet and an outlet and a channel for guiding a cooling/lubricating fluid and wherein the input shaft (44) and the first differential shaft (50) form an annular chamber for guiding the cooling/lubricating fluid.

* * * * *